United States Patent [19]

Dillon

[11] 4,434,618
[45] Mar. 6, 1984

[54] ENGINE CONSTRUCTION

[76] Inventor: Corbett L. Dillon, R.R. 4, Box 176, Olive Hill, Ky. 41164

[21] Appl. No.: 399,663

[22] Filed: Jul. 19, 1982

[51] Int. Cl.³ .............................................. F03G 7/06
[52] U.S. Cl. ......................................... 60/528; 60/527
[58] Field of Search .......................... 60/527, 528, 529

[56] References Cited

U.S. PATENT DOCUMENTS 3,937,019  2/1976  Renner ................................. 60/527
4,086,769  5/1978  Smith .................................... 60/527

FOREIGN PATENT DOCUMENTS 45250  2/1982  European Pat. Off. .............. 60/528

Primary Examiner—Allen M. Ostrager
Assistant Examiner—Stephen F. Husar
Attorney, Agent, or Firm—Karl W. Flocks; Sheridan Neimark

[57] ABSTRACT

An engine has at least two piston-cylinder assemblies each comprising a cylinder formed in an engine block with a cylinder head and a piston therein in sliding relationship toward and away from the head, a piston rod operatively connected to the piston and to a crankshaft, motion producing member of shape-memory material, e.g. Nitinol, having a transformation temperature range, secured to the cylinder head and the side of the piston opposite from the connecting rod, the motion producing member having a heat treated high temperature extended shape memory position and a low temperature low energy compressed position, the Nitinol member being of hollow tubular form and having pressure and return hoses connected thereto for supplying and removing cooling fluid into and from the Nitinol member, an electrical heating device connected to the Nitinol member, whereby the Nitinol member is easily compressed with relatively little force from the extended shape memory position to the compressed position when cooling fluid is supplied thereto to reduce the temperature of the Nitinol member to or below the lower limit of the transformation temperature range and the Nitinol member is automatically extended with relatively great force from the compressed position to the shape memory position when heated by the heating device to or above the upper limit of the transformation temperature range.

6 Claims, 9 Drawing Figures

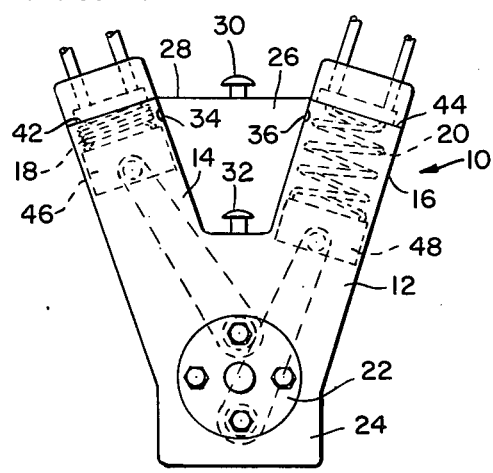

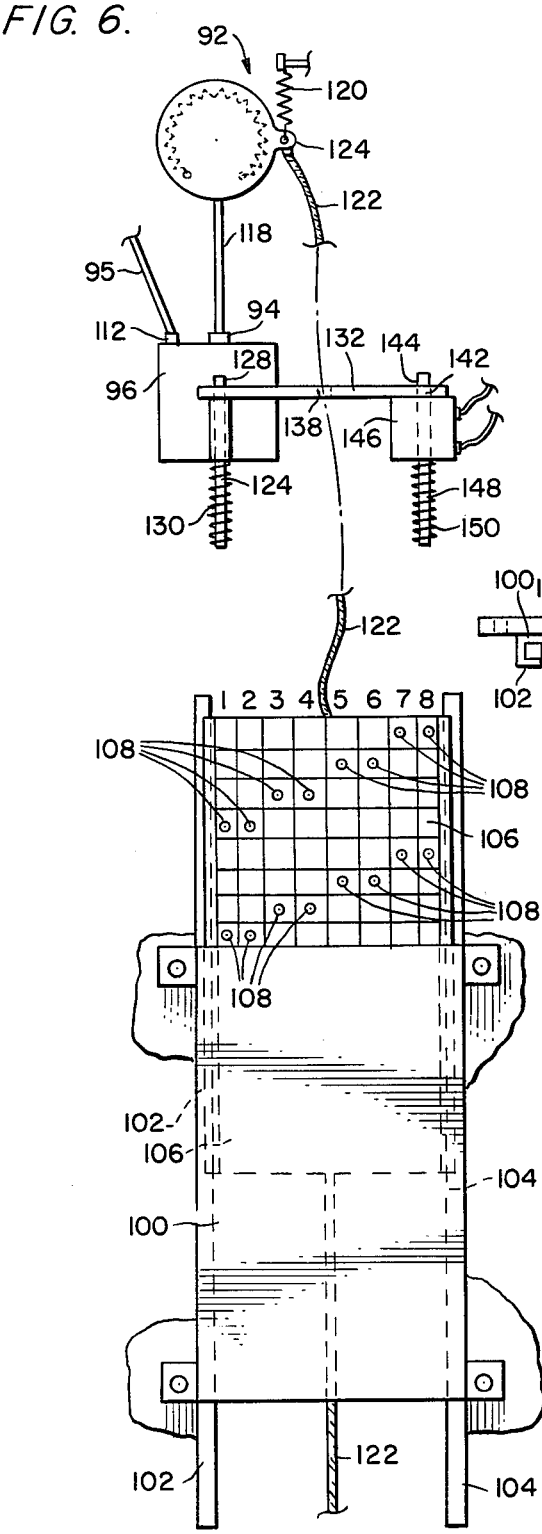

ENGINE CONSTRUCTION

BACKGROUND OF THE INVENTION

1. Field of the Invention

The invention disclosed and claimed herein is in the field of energy conversion. More particularly, the disclosed invention relates to an engine construction conceived for the purpose of converting heat energy into mechanical motion.

2. Description of the Prior Art

The most relevant prior art with respect to the disclosed invention is believed to be U.S. Pat. No. 4,086,769 (Smith), found with art in Class 60, Subclass 527 in the U.S. Patent and Trademark Office. The engine disclosed in the Smith patent comprises a plurality of spring-like elements made of shape-memory material, each of which is secured within a chamber and operatively connected with a plunger rod, a wrist bearing, a connecting rod, and a crankshaft and coordinated with similar spring-like elememts to drive the crankshaft. Shape-memory materials, for example, a nickel-titanium alloy, known as Nitinol, are materials which may be easily deformed with little force at a relatively low temperature and which upon being heated to a relatively high temperature will quickly, automatically revert with great force to an original shape in a physical phenomenon commonly referred to as shape-memory effect. Such material acquires its shape-memory or original shape after being subjected to a heat treatment or annealing process. After a shape-memory has been acquired by such material, it may thereafter be alternately cooled below and heated above a critical temperature to be respectively easily deformed from and allowed to revert with great force to its memory shape. Operation of the Smith apparatus is achieved by alternately heating and cooling the shape-memory elements by introducing hot and cold fluids into the chambers of the various shape-memory elements.

In accordance with the prior art then, apparatuses utilizing the power of a shape-memory alloy to perform useful work including means capable of providing periodic temperature variation necessary to the operation thereof are known. Control means may be provided to effect output power or speed by use of shape-memory elements. As it is known that shape-memory elements, when heat treated to a particular memory shape, can thereafter be mechanically deformed, when cold, by much less force than they exert upon being heated and spontaneously returning to their memory shape, the difference in force exerted may be applied to a crankshaft of perform useful work. While it is known in the prior art to use nickel-titanium alloys known as Nitinol to form shape-memory elements, other more workable alloys may later become used for the same purpose. Since the development of Nitinol, it has been recognized that when this alloy of nickel and titanium has been heat treated to a particular shape, it will acquire a memory shape which can be mechanically deformed at a low temperature to a limit of about 8% outer fiber strain and then return to its memory shape upon being heated in accordance with a Martensitic transformation. When this alloy is below its transformation temperature, the force needed to deform it is small. Once heated above its transformation temperature, it attempts to return to its memory position with great force. It is also known that the transformation temperature of Nitinol can be varied from $-90°$ F. to $+275°$ F. or more, by changing its composition. Some engines have already been made using Nitinol to convert heat energy into mechanical energy. Such engines, however, depend on an external source of heat and cold fluids for operation. Moreover, the circulation of fluid around the shape-memory elements in such engines slows down the RPM.

It is also known that the TTR range of the Nitinol elements used in such an engine widens greatly under a load (NASA SP-5110).

SUMMARY OF THE INVENTION

Based upon considerations set forth below and, in part, at least upon the considerations discussed above, applicant has conceived and developed the disclosed invention in order to provide a new and improved engine having shape-memory material elements incorporated therein and utilizing heat energy supplied to the shape-memory elements to provide rotary motion, for example, to a crankshaft or the like.

With the foregoing in mind, an object of this invention is to provide an engine incorporated with Nitinol or like shape-memory elements to achieve or approach absolute maximum output power and RPM's.

It is another object of this invention to provide the disclosed engine with controls for varying heat to compensate for broadening or widening the transformation temperature range (TTR) under load.

It is yet another object of this invention to construct a new and improved engine including elements made of shape-memory material and to apply the characteristics of such material to advantage in the operation of the improved engine.

BRIEF DESCRIPTION OF THE DRAWINGS

In the accompanying drawings in which a preferred embodiment of the disclosed invention is illustrated:

FIG. 1 represents a schematic elevational view from the rear of the engine according to the present invention;

FIG. 2 represents a schematic side elevational view of the engine of FIG. 1 showing the relationship of various working parts;

FIG. 3 shows on an enlarged scale a fragmentary view of a piston and cylinder assembly of the disclosed engine;

FIG. 6 shows a schematic representation of a distributor mechanism and associated current control switch plate apparatus for supplying heat to shape-memory elements; and FIG. 7 is an elevational sectional view on an enlarged scale of the switch plate apparatus in FIG. 6.

DETAILED DESCRIPTION OF THE INVENTION

Figure 3A:
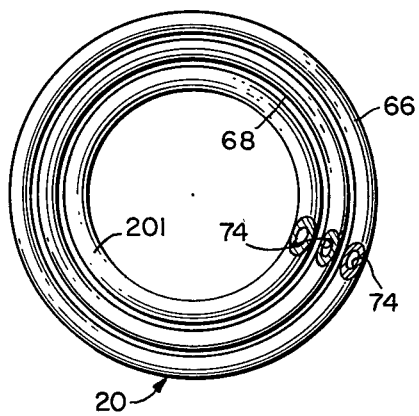
FIG. 3A is a view taken along the plane 3A—3A, looking in the direction of the arrows, in FIG. 3.

Referring now in detail to the drawings, the reader will see in FIG. 1 that the disclosed invention is embodied in a new and improved engine 10 formed with a V-shaped engine block 12 including banks 14 and 16. Engine 10, which is designed to develop the full potential of shape-memory allow material, clearly may be build in multiples of pairs of cylinders, e.g., two, four, six, eight cylinders, or other multiples of pairs of cylinders. The essential feature of the engine illustrated in FIG. 1 is the use of motion producing means 18, 20 which are made of shape-memory material, the best known of which is a nickel-titanium alloy, also known as Nitinol. Engine 10 may also be seen to include a plate 22 on which a flywheel is to be attached. Engine 10 also includes an oil pan 24 behind plate 22, as shown in FIG. 3, and below banks 14 and 16 to receive lubrication oil gravitating thereto. A large V-shaped area 26 extends between banks 14 and 16. This area 26 is shown to be closed by a cover 28 formed with a baffled vent tube 30. Oil pan 24 is also provided with a vent 32. Each cylinder in engine banks 14, 16 includes a large port 34, 36, respectively. Ports 34, 36 which may be rectangular, are located near the top of the engine banks 14, 16 to enable equalization of pressure into area 26. Baffled vent tube 30 is provided to allow air to escape from or enter into area 26 as needed for pressure equalization. The vent 32 for oil pan 24 operates to prevent oil from entering open area 26 in its venting process. As disclosed, engine 10 is of the non-combustion type and includes no valves, no intake manifold, and no exhaust manifold.

As is generally represented in FIG. 1 and more clearly illustrated in FIG. 2, motion producing means 18, 20 operate alternately between compressed position A and extended position B. In this regard, a side elevation representation of the structure of FIG. 1 is shown in FIG. 2 with two cylinders in simplified form, wherein motion producing means 18 is in compressed condition or position in a cylinder 38 of bank 14 while motion producing means 20 is in extended condition or position in a cylinder 40 of bank 16. It follows from FIG. 2 that motion producing means 18, 20 are disposed between head portions 42, 44 of cylinders 38, 40 and pistons 46, 48, respectively. It also follows that pistons 46, 48 which reciprocate within cylinders 38, 40 are operatively connected to crankshaft 50 by connecting rods 52, 54, respectively, in opposed phase relationship at throw portions 56, 58 whereby motion producing means 18, 20 in operation will inherently alternate between compressed positions A and extended positions B, respectively.

In accordance with the inventive concept, motion producing means are made of shape-memory material, such as nickel-titanium alloy known as Nitinol, which has a transformation temperature range (TTR) variable from about −90° F. to about +275° F. or more by changing its composition. With the foregoing in mind, motion producing means 18, 20 are formed of shape-memory material in coil spring configuration and heat treated to the shape-memory extended condition or position B and thereafter allowed to acclimate to ambient temperature. Formed and heat treated thusly, motion producing means 18, 20 may readily be mechanically deformed or compressed with relatively little force at temperatures cooled to below critical temperature, for example, and when heated to the critical or transformation temperature wil with great force automatically resume the shape-memory condition thereof. From the foregoing description, it may be readily understood that when motion producing means 20 is heated to its extended shape-memory condition B with great force, which is used to rotate crankshaft 50, a small part of this force is transmitted to motion producing means 18, which is relatively cool, to compress the latter to condition A. In the continuing operation of engine 10, motion producing means 20 is continuously alternately heated and cooled while simultaneously motion producing means 18 is continuously alternately cooled and heated to thus drive crankshaft 50. Useful work may then be obtained from crankshaft 50, for example, by way of a flywheel and a pulley to be operatively associated therewith.

Looking at FIGS. 3 and 3A in detailed, it may be readily understood that motion producing means 20, which is in its heated and extended shape-memory condition B, is secured at one end to the end of piston 48 by a connector block or plate 60 by bolts 62 extending through the piston 48 and by nuts 64. Motion producing means 20, which is made of shape-memory material, is represented as a single continuous element with a first or outer helical coil 66 and a second or inner helical coil 68, as may be seen in FIG. 3A. Outer coil 66 as formed and assembled will in operation not come into contact with the wall of cylinder 40 or with inner coil 68 in alternating between the compressed and extended conditions A and B, respectively. The wall of cylinder 40 is to be understood as being coated with Teflon or like non-conducting, low-friction material. Coils 66, 68, on the other hand, are to be understood as being coated with a highly flexible, heat resistant material in the event that such parts should come into contact, as during harmonic motions at high speed. Coolant may also be circulated outside coils 66, 68 beneath the covering. Connector plate 60, bolts 62, and nuts 64 are shown to be electrically insulated from piston 48 by pad 70 of insulation material with sleeves 72.

As may be understood from FIG. 3A, motion producing means 20 is formed as a hollow member with a passage 74 extending continuously through outer coil 66 and inner coil 68 and ends 76, 78 which may be threaded for connection to the cylinder head in cylinder 40. In order to effectively cool motion producing means 20 so that it may be readily mechanically deform with little force to its compressed condition A coolant is introduced, under pressure of a pump, through a supply hose 80 into motion producing means 20 after which such coolant may be discharged to a reservoir through return hose 82. Basically, the coolant enters through one of the coils, inner coil 68, for example, goes through a passage 84 in the block 60 which is insulated from the piston 48, but attached thereto, and returns through the other coil 66 as may be seen in FIGS. 3 and 4. While coils 66, 68 are represented as one continuous member, they may be formed from separate members as long as they are assembled with sealed continuous communicating passages. Also, while motion producing means 20 is formed with only two coils 66, 68, it may be formed with three or more coils as long as they are assembled so as to provide free operation without interference and with continuity insofar as coolant transfer is concerned.

In order to raise the temperature of the shape-memory material motion producing means, the disclosed invention has been devised with electrical heating current being delivered to coils 66, 68 by cables 83, 83 with inner coil 68 and outer coil 66, being grounded at the top to cylinder head in cylinder 40 at ground connector element 85. More particularly, electrical heating current is grounded to coils 66, 68 by an innermost coil 201, shown in FIG. 3A as a tubular coil, which may be a solid coil. Coil 201 which may or may not be of shape-memory material as shown in FIG. 3 includes an upper end extending up to and through connector element 85 in ground relationship with plate 86 and a lower end extending down to block 60 with which coils 66, 68 are in contact. For ease of assembly and less maintenance, coils 66, 68 may be formed with their ends in an assembly plate or block 86 for installation in the cylinder head. At the top of the coils 66, 68, the ends extend through holes in plate 86, which is disc shape, and is disposed in recess 88 in the cylinder head. The ends of coils 66, 68 are assembled with insulator collars 90 around them where they pass through plate 86 and the cylinder head so that when electrical current is supplied thereto, such current passes through them to the ground 85 to supply the necessary heat to trigger the automatic reaction of the coils 66, 68 snapping to their memory extended condition B with great force. Where the motion producing means 20 is formed with three or more coils, the inner coil would be grounded to the cylinder heat at the top of such coil. With resistance to electricity blended into the working elements or coils, the ground could virtually be eliminated.

The structural arrangement of motion producing means 18 should be substantially as described above for motion producing means 20. Supply and return hoses 80, 82 are of non-conducting material so that electricity will not be diverted thereat. Cooling the shape-memory coils or elements 66, 68 can be accomplished by circulating water through them or by utilizing Freon or the like as in an air conditioner system. It appears that Freon would be the most suitable coolant to use. If water is used, it should be independent of the system used to cool the engine block, that is, it should have its own pump and radiator. Coolant should always be well below the TTR range so that once current no longer is passing through the coils, they would become elastic and compressible spontanously.

The engine block would probably not develop sufficient heat to require being water cooled, however, as air cooling should be sufficient. Cooling of the shape-memory elements 18, 20 would have to be pre-set to a certain limit to avoid damage thereof. Current for heating the motion is furnished through an ignition switch to a spring-loaded current control mechanism 92 illustrated in FIG. 6. From here, the current passes to the center terminal 94 in the distributor 96 where the rotor 98 directs it to the motion producing means 18, 20 in mechanically deformed position A via control plate 100.

As assembled for operation with engine 10, control plate 100 is fixedly supported and includes inwardly directed tracks or flanges 102, 104, as may be seen in FIG. 7, on which a cooperating plate 106 is supported in sliding relationship therewith. Plate 106 is made of insulating or dielectric material and includes a plurality of electrical cables 83 attached thereto with contact points 108 which establish contact with conductor strips 110 on plate 100 according to a given pattern. Tracks 102, 104 are shown to extend to the rear of plate 100 for about half the length of plate 100.

In order to delivery current to heat the various motion producing means 18, 20 according to a controlled timing or sequence, distributor device 96 is shown in FIG. 6. Details of distributor device 96 are more clearly shown in FIG. 5 wherein contact terminals 112 for attachment of cables 95 to furnish heating current from an ignition coil, for example, to the motion producing means 18, 20. A plurality of circumferentially disposed triangular electrical contact areas 114 are provided inside distribtor 96 which the tip 116 of rotor 98 seuentially engages to deliver heating current to the motion producing means 18, 20 of cylinders 38, 40 and other cylinders from the ignition through control mechanism 92, cable 118, center terminal 94, and individual contact areas 114. In order to counteract the pull of spring 120 or current control mechanism 92, a cable 122 connected to the accelerator is also connected to plate 106 for pulling thereon and to an ear 124 extending radially from control mecanism 92. The motion producing means 18, 20 in the various cylinders 38, 40 will receive heating current when the accelerator is depressed far enough to establish contact of points 108 on plate 106 with the conductor strips 110 on fixed plate 100 so that cables 83 may then carry current to the shape memory coils of motion producing means 18, 20. Plate 106 is designed to bring the contact points 108 of inner shape-memory coils of two cylinders into contact with conductor strips 110 of plate 100 at the same time to avoid throwing the engine 10 out of balance. As pressure on the accelerator cable 118 pulls plate 106 into contact with plate 100, the inner shape memory coils 68 in the cylinders are activated first, two cylinders at a time, then the outer coils 66 are engaged two cylinders at a time until all coils are activated. By two cylinders at a time, it is meant that one cylinder on each bank of the motor is activated together to ensure balance much the same as in conventional engines.

Timing of electrical current delivered according to optimum operation is such as to cease just before the pistons 46, 48, etc., reach bottom of stroke so that the Nitinol or similar coils cool below their TTR range, thus allowing them to turn elastic and be mechanically deformed with ease again by pressure exerted by other cylinder or cylinders in a cyclic timed relationship, thus causing the crankshaft 50 to turn and thereby perform useful work. Since the force needed to mechanically deform the Nitinol coils is much less than the force exerted by them as they return to their memory position, this engine will have a substantial power output. Once both the shape-memory coils in each of the cylinders are receiving current to activate them and all cylinders are engaged, further pressure on the accelerator will slide distributor cap 96 downward thus holding current on each of the coils longer and producing more heat to activate them even though the TTR range has widened under load. Since accelerator cable 122 is also hooked to the spring loaded current control mechanism 92, further pressure on the accelerator will increase the amount of current to the distributor cap 96. The total amount of current is preset so as to deform the Nitinol coils.

Figure 5:
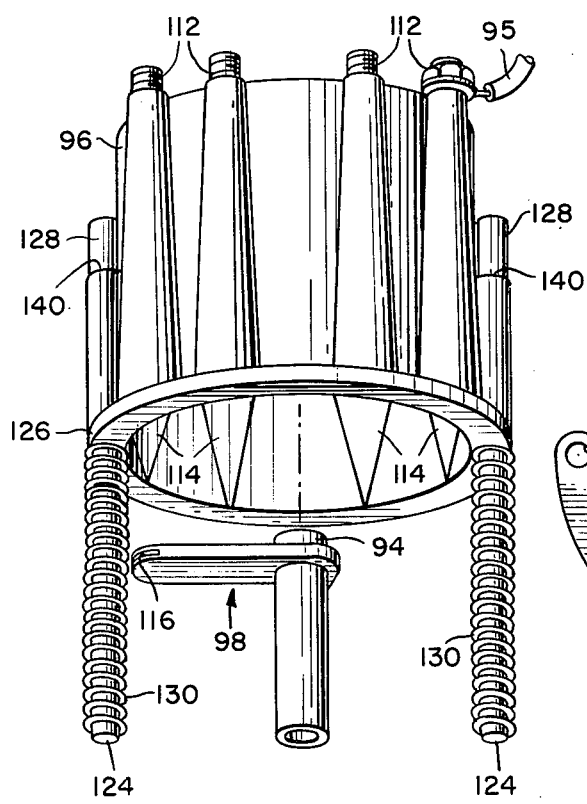
FIG. 5 is an exploded view on an enlarged scale in perspective of a distributor mechanism for the disclosed engine.
Figure 5A:
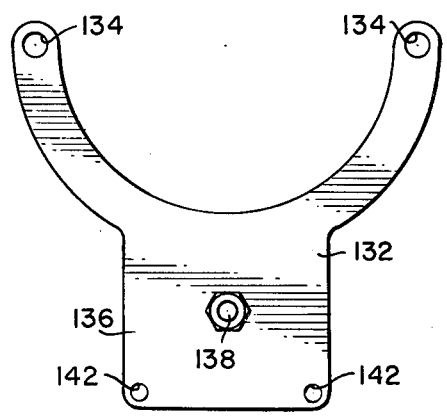
FIG. 5A represents a bracket device to be assembled on the distributor mechanism.

From FIG. 5, distributor cap 96 may be seen to comprise a pair of legs 124, 124 extending downwardly from the underside of a circular flange 126 and a pair of posts 128, 128 extending upwardly from flange 126. In assembly springs 130, 130 will be disposed around legs 124, 124 and tend to urge distributor cap 96 in an upward direction or provide a resilient support therefor. A yoke-like bracket 132 including an arcuate bight portion shown in FIG. 5A is formed with apertures 134, 134 adjacent the tips of the bight portion. Bracket 132 also includes tongue-like flange 136 extending radially, outwardly from the center of the bight portion. Tongue-like flange 136 includes a hole 138 extending therethrough. As assembled, bracket 132 is supported on distributor cap 96 with apertures 134, 134 disposed around posts 128, 128 and resting on shoulders 140, 140 formed on posts 128, 128. Accelerator cable 122 will pass through hole 138 of bracket 132 and extend between control mechanism 92 and plate 106 as shown in FIG. 6. It is also to be understood that accelerator cable 122 will be attached to bracket 132 at hole 138. Additional apertures 142, 142 are provided at the corners of the free end of the tongue-like flange 136 which apertures are placed around rod-like extensions 144, 144 on top of sliding switch 146, which is wired to a coolant pump to increase cooling as heat is increased. Switch 146 includes downwardly extending legs 148 with springs 150 disposed therearound as in the manner of comparable parts of distributor 96. As may be seen in FIG. 6, considerable slack is present in accelerator cable 122 between control plate 106 and distributor cap 96. This sack allows all coils 66, 68 in the cylinders to be activated before the cable 122 becomes taut and moves the distributor cap 96 downwardly, thus holding electrical current on the Nitinol coils longer to compensate for the widening of the TTR range under load. It is clear also that as the distributor cap 96 moves down the current control provides an increase in current to the rotor to furnish the Nitinol motion producing coils with more heat. Plates 100 and 106, rotor 98, and distributor cap 96 are to be understood to provide direct current, not induction current as in conventional automobile engines. The cables 95 from the distributor cap 96 are attached to conductor strips 110 of plate 100. The cables 83 from under plate 106 are attached to the Nitinol coils 66, 68 in the various cylinders.

Also, as distributor cap 96 is moved downwardly by bracket 132 when accelerator cable 122 is pulled, switch 146 is moved downwardly so that greater coolant will be pumped to cool the Nitinol coils 66, 68 when they are heated to at a greater rate.

Figure 4:
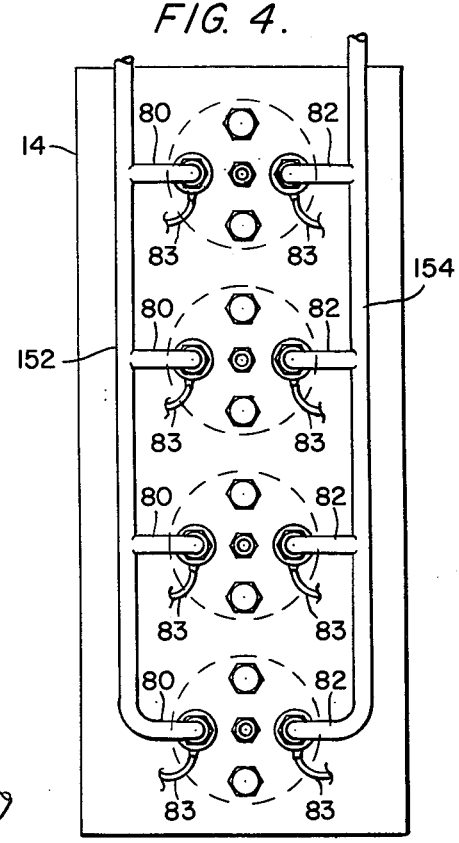
FIG. 4 is an orthogonal view of the top of one bank of the engine of FIG. 1 on a slightly enlarged scale.

As may be seen in FIG. 4, a coolant supply manifold 152 and a coolant return manifold 154 is shown to service supply hoses 80 and return hoses 82, respectively, for the various cylinders.

Upon further consideration of the appended drawings, the reader should readily perceive that the present invention relates to an improved engine 10 with at least two cooperating piston-cylinder assemblies wherein each of the assemblies comprises a cylinder 38, 40 formed in an engine block 12 with a cylinder head 42, 44 and a piston 46, 48 in sliding relationship in the cylinder 38, 40 toward and away from head 42, 44, respectively. A piston rod 52, 54 operatively connects to one side of the respective piston 46, 48 and to a crankshaft 50. Motion producing members or means 18, 20 of shape-memory material having a transformation temperature range, such as nickel-titanium or the like, are secured to the respective cylinder head 42, 44 and the side of piston 46, 48 opposite from the connecting rod 50. Motion producing means 18, 20, as assembled, have a heat treated high temperature extended shape memory position B and a low temperature low energy compressed position B. Motion producing means 18, 20 are of hollow tubular form and are assembled with pressure hose 80 and return hose 82 connected therewith for supplying and removing temperature reducing fluid into and from motion producing means 18, 20. Electrical heating means including cables 83, 83 connected to motion producing means 18, 20 and ground connection 85 are provided whereby motion producing means 18, 20 are readily compressed with relatively little force from the extended shape memory position B to the compressed position A when temperature reducing fluid is cyclically supplied to motion producing means 18, 20 through pressure hose 80 to reduce the temperature of the motion producing means to or below the lower limit of the transformation temperature range, with motion producing means 18, 20 thereafter being automatically extended with relatively great force from the compressed position A to the shape memory position B when heated by electric current delivered by cables 83, 83 to or above the upper limit of the transformation temperature range.

The improved engine 10 is further seen to be of V-shape configuration including two banks 14, 16 with one of the piston-cylinder assemblies located in a first one of the banks 14 and the other of piston-cylinder assemblies located in a second one of the banks 16 and with the connected rod 52 of the piston 46 located in the first bank 14 and the connecting rod 54 of the piston 48 located in the second bank 16 being operatively connected to the crankshaft 50 in opposed phase relationship at throw portions 56 and 58 at 180° from each other so that the piston 46 in the first bank 14 will be at top dead center position when the piston 48 in the second bank 16 is at bottom dead center position and vice versa whereby the motion producing means 18 of the piston 46 in the first bank 14 will be forced to compressed condition A by the piston 46 being urged to top dead center position in the first bank 14 by the piston 48 urged to bottom dead center position in the second bank 16 by the extended motion producing means 20 connected thereto. The engine 10 also includes means for alternately supplying cooling fluid under pressure through supply hose 80 to and withdrawing cooling fluid through return hose 82 from each of the motion producing means 18, 20 in opposed phase relationship and electrical means 83 for alternately heating motion producing means 18, 20 to above transformation temperature range when all or substantially all cooling fluid has been withdrawn therefrom. The control means 92 along with switch 146 control a pump for varying flow rate of cooling fluid to and from the motion producing means 18, 20 and heat to the motion produing means 18, 20 in response to acceleration demand with heat being sequentially delivered to the motion producing means 18, 20 in each cylinder of the engine 10 as controlled by distributor apparatus 96 and plates 100 and 106 as described above.

Alternate embodiments of the disclosed invention within the basic concept thereof may include coolant flowing around outside the coil elements 66, 68, underneath their flexible cover as well as through them.

For optimum design considerations, all shape-memory material elements are to have the same TTR and the ground coil should have a higher TTR if it is of Nitinol material.

It will be obvious to those skilled in the art that various changes may be made without departing from the scope of the invention and, therefore, the invention is not limited to the several embodiments shown in the drawings and described in the specification but only as indicated in the appended claims. For example, solid Nitinol coils may be used instead of the tubular coils when circulating the coolant underneath their flexible covering.

What is claimed is:

1. An improved engine with at least two cooperating piston-cylinder assemblies wherein each of said assemblies comprises a cylinder formed in an engine block with a cylinder head and a piston in sliding relationship in said cylinder toward and away from said head, a piston rod operatively connected to one side of said piston and to a crankshaft, motion producing means of shape-memory material having a transformation temperature range, such as nickel-titanium or the like, secured to said cylinder head and the side of said piston opposite from said connecting rod, said motion producing means having a heat treated high temperature extended shape memory position and a low temperature low energy compressed position, said motion producing means being of hollow tubular form and having pressure and return hoses connected to said motion producing means for supplying and removing temperature reducing fluid into and from said motion producing means, and electrical heating means connected to said motion producing means, whereby said motion producing means is readily compressed with relatively little force from the extended shape memory position to the compressed position when temperature reducing fluid is supplied to said motion producing means through said pressure hose to redue the temperature of the motion producing means to or below the lower limit of the transformation temperature range and said motion producing means is autmoatically extended with relatively great force from the compressed position to the shape memory position when heated by said heating means to or above the upper limit of the transformation temperature range.

2. The improved engine as defined in claim 1, wherein said engine is of V-shape configuration including two banks with one of said piston-cylinder assemblies located in a first one of said banks and the other of said piston-cylinder assemblies located in a second one of said banks and with the connecting rod of the piston located in said first bank and the connecting rod of the piston located in said second bank being operatively connected to said crankshaft in opposed phase relationship at throw portions 180° from each other so that said piston in said first bank will be at top dead center position when said piston in said second bank is at bottom dead center position and vice whereby the motion producing means of said piston in said first bank will be forced to compressed condition by said piston being urged to top dead center position in said first bank by said piston urged to bottom dead center position in said second bank by the extended motion producing means connected thereto.

3. The engine as defined in claim 2, including means for alternately supplying cooling fluid under pressure to and withdrawing cooling fluid from each of said motion producing means in opposed phase relationship and means for alternately heating said motion producing means to above transformation temperature range when all or substantially all cooling fluid has been withdrawn therefrom.

4. The improved engine as defined in claim 3, including control means for varying flow rate of cooling fluid to and from said motion producing means and heat to said motion producing means in response to acceleration demand.

5. The improved engine as defined in any one of claims 1, 2, 3, or 4 and further including a distributor apparatus for sequentially delivering heat to each of said motion producing means.

6. The engine as defined in claim 1, wherein said motion producing means comprise at least a pair of coaxially extending helical coil members of tubular form connected to said pressure and return hoses and said electrical heating means is also in the form of a helical coil and is disposed coaxially with and within said helical coil members.

* * * * *